(12) United States Patent
Inoue et al.

(10) Patent No.: US 7,250,383 B2
(45) Date of Patent: Jul. 31, 2007

(54) CLAD GLASS COMPOSITION FOR GRADED-INDEX ROD LENS, GRADED-INDEX ROD LENS, AND METHOD FOR MANUFACTURING THE SAME

(75) Inventors: Teruhide Inoue, Osaka (JP); Kunihiro Nomiyama, Osaka (JP); Yoshikazu Toshikiyo, Osaka (JP); Yukihito Nagashima, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 712 days.

(21) Appl. No.: 10/654,396

(22) Filed: Sep. 3, 2003

(65) Prior Publication Data

US 2004/0077478 A1 Apr. 22, 2004

(30) Foreign Application Priority Data

Sep. 4, 2002 (JP) .............................. 2002-258689

(51) Int. Cl.
- C03C 3/076 (2006.01)
- C03C 3/085 (2006.01)
- C03C 3/095 (2006.01)
- B32B 17/06 (2006.01)

(52) U.S. Cl. ............................ 501/55; 501/64; 501/69; 428/373; 428/378; 428/388; 428/426; 428/428; 359/652

(58) Field of Classification Search .................. 501/55, 501/64, 69; 428/426, 428, 373, 378, 388; 359/652

See application file for complete search history.

(56) References Cited

U.S. PATENT DOCUMENTS

| | | | |
|---|---|---|---|
| 6,010,787 A | | 1/2000 | Yamaguchi et al. |
| 6,141,155 A | * | 10/2000 | Yamaguchi et al. ........ 359/652 |
| 6,476,975 B1 | | 11/2002 | Yoshii et al. |
| 6,511,932 B2 | * | 1/2003 | Yamaguchi et al. .......... 501/63 |
| 6,764,972 B2 | * | 7/2004 | Yoshii et al. .................. 501/63 |
| 2004/0229743 A1 | * | 11/2004 | Wolff et al. ................... 501/67 |
| 2005/0231815 A1 | * | 10/2005 | Miyauchi et al. ........... 359/652 |
| 2006/0019815 A1 | * | 1/2006 | Inoue et al. .................. 501/72 |

FOREIGN PATENT DOCUMENTS

| | | |
|---|---|---|
| CN | 1295986 | 5/2001 |
| JP | 8-13691 | 2/1996 |
| JP | 10-139468 | 5/1998 |
| JP | 10-139472 | 5/1998 |

* cited by examiner

*Primary Examiner*—Karl Group
(74) *Attorney, Agent, or Firm*—Hamre, Schumann, Mueller & Larson, P.C.

(57) ABSTRACT

It is an object of the present invention to provide a clad glass composition for graded-index rod lens for covering, during manufacturing, a preform glass composition lens of a graded-index rod lens that does not include PbO, in which the composition substantially does not include PbO, and expressed in mol % includes $SiO_2$: 45 to 65, $Na_2O$: 3 to 30, $K_2O$: 0 to 10, MgO: 0 to 15, BaO: 0 to 20, where $Na_2O+K_2O$: 3 to 35 and MgO+BaO: 0 to 25, and furthermore includes $B_2O_3$: 0 to 15, ZnO: 0 to 10, $TiO_2$: 0 to 10, $Y_2O_3$: 0 to 7, $ZrO_2$: 0 to 7, $Nb_2O_5$: 0 to 7, $In_2O_3$: 0 to 7, $La_2O_3$: 0 to 7, $Ta_2O_5$: 0 to 10, where $B_2O_3+ZnO+TiO_2+Y_2O_3+ZrO_2+Nb_2O_5+In_2O_3+La_2$ to 20, and a content of at least one of $TiO_2$ and $La_2O_3$ is substantially 0 mol %.

3 Claims, 2 Drawing Sheets

CLAD GLASS COMPOSITION FOR GRADED-INDEX ROD LENS, GRADED-INDEX ROD LENS, AND METHOD FOR MANUFACTURING THE SAME

BACKGROUND OF THE INVENTION

1. Field of the Invention

The present invention relates to graded-index rod lenses used in image writing devices and image reading devices, and methods for manufacturing the same, and in particular relates to the compositions of glass covering the lateral surface of the lens when it is manufactured.

2. Description of the Related Art

Graded-index rod lenses are rod-shaped lenses with a cross-sectional refractive index distribution that changes from the center toward the circumference. Because of the many advantages of graded-index rod lenses, such as their ability to form images even with flat end faces and the ease with which they can be used to fabricate lenses with miniature diameters, in recent years they have found wide application as image-forming lenses in the optical systems of image writing devices such as LED array printers and liquid crystal shutter printers and image reading devices such as fax machines and scanners.

Such graded-index lenses having this wide range of application are fabricated by forming a graded refractive index distribution within a glass body from its center toward its circumference through cation exchange. With cation exchange, a glass body including first cations that can be used as network modifier oxides is brought into contact at elevated temperatures with molten salt including second cations that can constitute network modifier oxides, thereby substituting the first cations in the glass body with the second cations in the molten salt.

The three following methods are usually performed to provide such graded-index rod lenses with a rod-shape.

(1) Shaving Method

A rod of a predetermined shape is produced by shaving a glass block. With this method, only a few rods can be produced at one time and it is difficult to produce rods with a rod diameter of 0.5 mm or less.

(2) Drawing Glass Method

Raw glass in block form is processed, producing a preform rod with a diameter of approximately 20 to 50 mm and a length of approximately 200 to 800 mm, and this is suspended in a tubular furnace and elongated as it is heated, obtaining a glass rod. This method offers a significant improvement in productivity over the shaving method and can be used to produce rods with narrow diameters. However, although devitrification is unlikely to occur, this method is not suited for large-scale production because the drawing velocity is slow at about 1 m/min and it is necessary to perform drawing for each rod individually. Moreover, it is difficult to produce rods with a double core/clad structure, which will be described later.

(3) Direct Drawing Method of melt glass (Continuous Drawing Method)

As shown in FIG. 1, a molten raw glass 11 that has been subjected to melting, bubble removal, and a fining process is incubated by a heater 13 inside an insulating material 15, gradually cooling as it is allowed to flow down through a cylindrical nozzle 12. It is then extruded out through a nozzle lower end 14, and subjected to heating and stretching, forming a continuous glass rod (fiber) 17 having a diameter of about 0.1 to 4 mm. With this method, the drawing velocity can be set to a drawing velocity that is of a magnitude dozens of times that of the drawing glass rod method, and there is extremely high productivity because raw glass can be fed continuously, allowing uninterrupted production.

These three methods are chosen depending on the ease with which the rod can be formed.

With the direct drawing method of melt glass, devitrification occurs easily when the molten glass is slowly cooled within the nozzle. In particular, to prevent devitrification in the preform glass for graded-index lenses including a large lithium component, measures such as adding an additive have been taken (see JP H8(1997)-13691B).

As shown in FIG. 2, direct drawing allows a rod with a double structure, in which the lens preform is covered by providing a two-channel nozzle, to be provided easily. If the composition of the clad glass of the double structure is a composition with which devitrification does not occur easily, then with direct drawing, contact between the lens preform glass and the nozzle portion in the temperature range where devitrification occurs easily can be avoided, and thus devitrification in the lens preform can be prevented and the overall drawing properties are improved (see JP H10 (1998)-139468A).

Providing the rod with a double structure for example makes it possible to add the effect of stray light removal if a color component is introduced into the portion with the clad glass composition and a plurality of rod lenses are used arranged in a line, and also allows cracks, which occur easily due to the stress that occurs in the lens preform portion during ion exchange, to be inhibited. Thus compared to a single structure, a double structure often allows the rod to be provided with superior characteristics (for example, see JP H10(1998)-139472A).

Thus, direct drawing is the method that usually is used to mass-produce high-performance rods having a double structure employing clad glass.

The graded-index rods that are the subject of this invention are those that as mentioned above are used in the optic systems of devices for reading or writing images. Consequently, particularly when handling full-color images, there is a need to simultaneously maintain a sufficient angle of aperture and keep the color dispersion small. To reduce color dispersion, a preform glass composition that does not include PbO as a component is preferable. However, in terms of manufacturing, there is the problem that a composition that does not include PbO is extremely prone to devitrification.

SUMMARY OF THE INVENTION

The present invention was arrived at in order to solve the above problems, and it is an object thereof to produce in large quantities graded-index rod lenses of a composition that does not include PbO using a direct drawing method of melt glass. More specifically, it is an object thereof to provide graded-index rod lenses having little color dispersion and with which a certain constant angle of aperture can be maintained, methods for manufacturing the same, and clad glass compositions for graded-index lens that prevent the occurrence of devitrification.

A clad glass composition for graded-index rod lens of the present invention is a clad glass composition for covering, during manufacturing of lens, a preform glass composition of a graded-index rod lens that does not include PbO, wherein the composition substantially does not include PbO, and expressed in mol % includes:

$SiO_2$: 45 to 65
$Na_2O$: 3 to 30
$K_2O$: 0 to 10
MgO: 0 to 15
BaO: 0 to 20 wherein $Na_2O+K_2O$: 3 to 35
MgO+BaO: 0 to 25 and furthermore also includes:

$B_2O_3$: 0 to 15
ZnO: 0 to 10
$TiO_2$: 0 to 10
$Y_2O_3$: 0 to 7
$ZrO_2$: 0 to 7
$Nb_2O_5$: 0 to 7
$In_2O_3$: 0 to 7
$La_2O_3$: 0 to 7
$Ta_2O_5$: 0 to 10 wherein
$B_2O_3+ZnO+TiO_2+Y_2O_3+ZrO_2+Nb_2O_5+In_2O_3+La_2O_3+Ta_5O_5$: 0 to 20, and a content of at least one of $TiO_2$ and $La_2O_3$ is substantially 0 mol %.

"The composition substantially does not include PbO" means the composition substantially does not include PbO except an unavoidable trace amount of PbO. "A content of $TiO_2$ is substantially 0 mol %" means a content of $TiO_2$ is substantially 0 mol % except an unavoidable trace amount of $TiO_2$. "A content of $La_2O_3$ is substantially 0 mol %" means a content of $La_2O_3$ is substantially 0 mol % except an unavoidable trance amount of $La_2O_3$.

A graded-index rod lens of the present invention is characterized in that a graded-index lens preform glass A is covered by and provided in a single unit with a clad glass composition B:

(1) wherein the glass composition of the graded-index lens preform glass A expressed in mol % includes $SiO_2$: 45 to 65, $Li_2O$: 3 to 20, $Na_2O$: 3 to 15, $K_2O$: 0 to 10, MgO: 0 to 15 BaO: 0 to 20, $TiO_2$: 0 to 10, ZnO: 0 to 10, $La_2O_3$: 0 to 7, $B_2O_3$: 0 to 15, where $Li_2O+Na_2O+K_2O$: 6 to 35;

(2) wherein the clad glass composition B substantially does not include PbO, and expressed in mol % includes $SiO_2$: 45 to 65, $Na_2O$: 3 to 30, $K_2O$: 0 to 10, MgO: 0 to 15, BaO: 0 to 20, where $Na_2O+K_2O$: 3 to 35 and MgO+BaO: 0 to 25, and furthermore includes $B_2O_3$: 0 to 15, ZnO: 0 to 10, $TiO_2$: 0 to 10, $Y_2O_3$: 0 to 7, $ZrO_2$: 0 to 7, $Nb_2O_5$: 0 to 7, $In_2O_3$: 0 to 7, $La_2O_3$: 0 to 7, and $Ta_2O_5$: 0 to 10, where $B_2O_3+ZnO+TiO_2+Y_2O_3+ZrO_2+Nb_2O_5+In_2O_3+La_2O_3+Ta_2O_5$: 0 to 20, and a content of at least one of $TiO_2$ and $La_2O_3$ is substantially 0 mol %.

A method for manufacturing a graded-index rod lens of the present invention is characterized in that a graded-index lens preform glass A is covered by and provided in a single unit with a clad glass composition B, (1) wherein a graded-index lens preform glass composition made of a glass composition of the graded-index lens preform glass A which, expressed in mol %, includes $SiO_2$: 45 to 65, $Li_2O$: 3 to 20, $Na_2O$: 3 to 15, $K_2O$: 0 to 10, MgO: 0 to 15 BaO: 0 to 20, $TiO_2$: 0 to 10, ZnO: 0 to 10, $La_2O_3$: 0 to 7, $B_2O_3$: 0 to 15, wherein $Li_2O+Na_2O+K_2O$: 6 to 35 is arranged in a center, and (2) wherein a clad glass composition of the clad glass composition B, which substantially does not include PbO and expressed in mol % includes $SiO_2$: 45 to 65, $Na_2O$: 3 to 30, $K_2O$: 0 to 10, MgO: 0 to 15, BaO: 0 to 20, wherein $Na_2O+K_2O$: 3 to 35, and MgO+BaO: 0 to 25, and furthermore includes $B_2O_3$: 0 to 15, ZnO: 0 to 10, $TiO_2$: 0 to 10, $Y_2O_3$: 0 to 7, $ZrO_2$: 0 to 7, $Nb_2O_5$: 0 to 7, $In_2O_3$: 0 to 7, $La_2O_3$: 0 to 7, and $Ta_2O_5$: 0 to 10, wherein $B_2O_3+ZnO+TiO_2+Y_2O_3+ZrO_2+Nb_2O_5+In_2O_3+La_2O_3+Ta_2O_5$: 0 to 20, and a content of at least one of $TiO_2$ and $La_2O_3$ is substantially 0 mol % is arranged on an outer side, and by performing conjugate melt drawing using a direct drawing device, the graded-index lens preform glass A is covered by and provided in a single unit with the clad glass composition B.

DETAIL DESCRIPTION OF THE INVENTION

Figure 1:
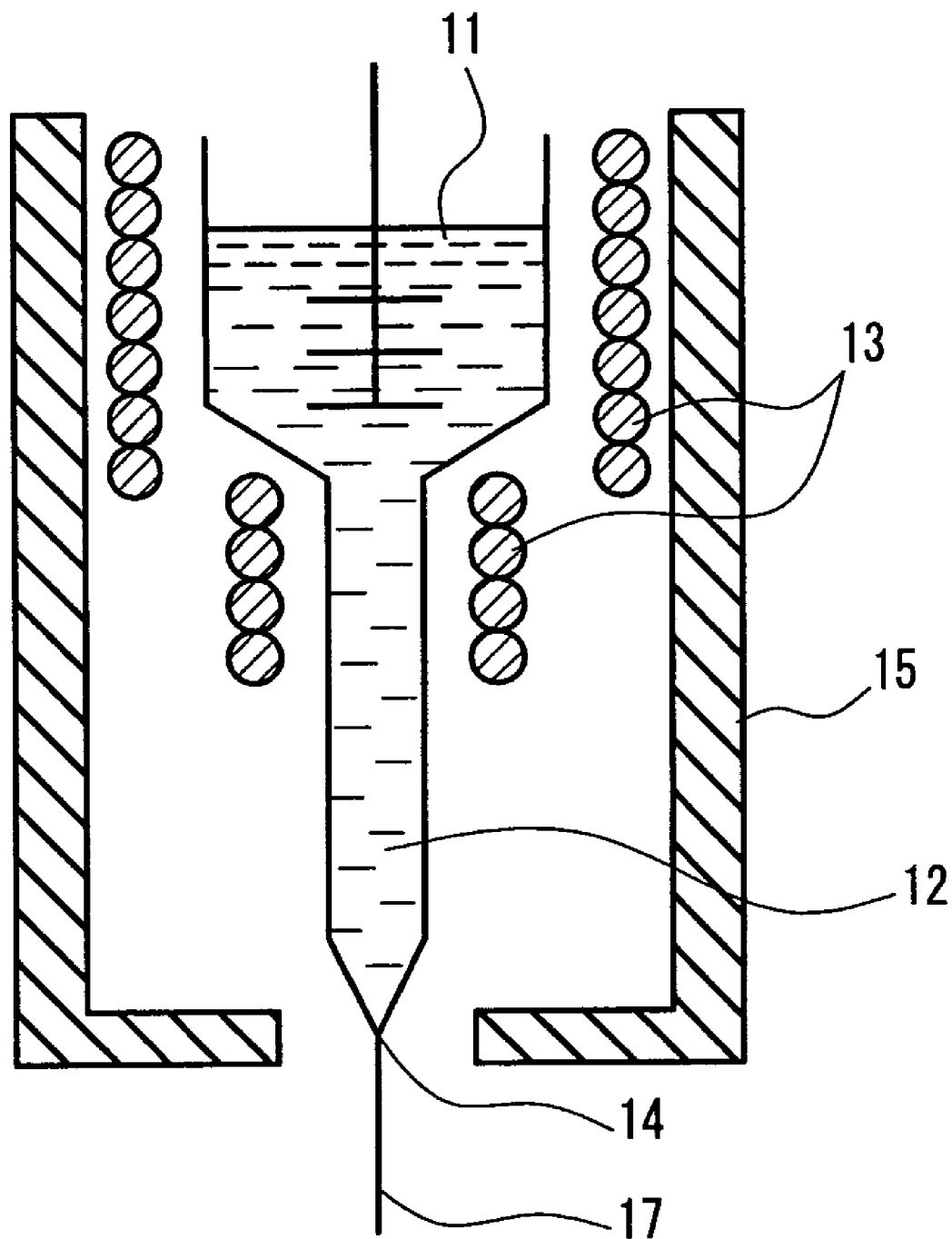
FIG. 1 is a schematic cross-sectional diagram of a conventional direct drawing device.

Intense testing and research regarding the composition of the above-mentioned glass covering a lens preform glass that does not include PbO led the inventors to the following composition ranges, that is, a glass composition that substantially does not include PbO and either $TiO_2$ or $La_2O_3$, nd a glass composition that substantially does not include any of PbO, $TiO_2$, or $La_2O_3$.

An example of the lens clad glass composition of the present invention is described below. First, a $SiO_2$—MgO—BaO—$La_2O_3$—ZnO—$B_2O_3$—$Na_2O$ based glass that does not include PbO, or alternatively a $SiO_2$—MgO—BaO—ZnO—$B_2O_3$—$Na_2O$ based glass that does not include PbO, was used. Moreover, the amount of $Na_2O$ added to the glass was restricted, and the composition was made to exclude $TiO_2$, or alternatively made to exclude $TiO_2$ and $La_2O_3$. By doing this, it became possible to inhibit the occurrence of devitrification and to mass-produce a graded-index rod lens with a large Abbe number, which serves as an index of color dispersion, of at least 40.

A lens clad glass of the present invention is a lens clad glass composition for covering, during manufacturing of the lens, a preform glass composition for a graded-index lens that does not include PbO. This composition substantially does not include PbO, and expressed in mol % includes $SiO_2$: 45 to 65
$Na_2O$: 3 to 30
$K_2O$: 0 to 10
MgO: 0 to 15
BaO: 0 to 20 wherein $Na_2O+K_2O$: 3 to 35
MgO+BaO: 0 to 25.

Also, it is preferable that the following oxides are within the content ranges of $B_2O_3$: 0 to 15
ZnO: 0 to 10
$TiO_2$: 0 to 10
$Y_2O_3$: 0 to 7
$ZrO_2$: 0 to 7

Nb$_2$O$_5$: 0 to 7
In$_2$O$_3$: 0 to 7
La$_2$O$_3$: 0 to 7
Ta$_2$O$_5$: 0 to 10
wherein
B$_2$O$_3$+ZnO+TiO$_2$+Y$_2$O$_3$+ZrO$_2$+Nb$_2$O$_5$+In$_2$O$_3$+La$_2$O$_3$+Ta$_2$O$_5$: 0 to 20, and a content of at least one of TiO$_2$ and La$_2$O$_3$ is substantially 0 mol %.

It is further preferable that the composition substantially does not include TiO$_2$ or the composition substantially does not include La$_2$O$_3$, and it is even more preferable that the composition includes neither TiO$_2$ nor La$_2$O$_3$. "The composition substantially does not include TiO$_2$" means the composition substantially does not include TiO$_2$ except an unavoidable trace amount of TiO$_2$. "The composition substantially does not include La$_2$O$_3$" means the composition substantially does not include La$_2$O$_3$ except an unavoidable trace amount of La$_2$O$_3$.

The lens clad glass of the present invention is effective with respect to a composition of a graded-index rod lens preform glass that is within the following composition ranges (unit: mol %). That is, it is preferable that SiO$_2$: 45 to 65
Li$_2$O: 3 to 20
Na$_2$O: 3 to 15
K$_2$O: 0 to 10
MgO: 0 to 15
BaO: 0 to 20
TiO$_2$: 0 to 10
ZnO: 0 to 10
La$_2$O$_3$: 0 to 7
B$_2$O$_3$: 0 to 15
wherein
Li$_2$O+Na$_2$O+K$_2$O: 6 to 35.

The manufacturing method of the present invention is a method in which a conjugate direct drawing device is used and the graded-index lens preform glass A is arranged in a central crucible and the clad glass composition B is arranged in an outer crucible thereof, and conjugate melt drawing is performed, that is, both A and B are extruded together, so that the graded-index lens preform glass A is covered by and provided in a single unit with the clad glass composition B.

EXAMPLES

The present invention will be described in further detail using the following working examples. It should be noted that the present invention is not limited to the following working examples.

(1) Method for Testing Devitrification

The occurrence of devitrification in glass of the compositions of the working examples was evaluated under the following conditions prior to drawing testing in order to assess whether devitrification will occur in the actual direct drawing process.

A clad glass with the composition to be tested was crushed to a diameter of about 1 mm. It was sufficiently cleaned with ethanol, after which it was placed evenly in a platinum boat 200 mm long, 12 mm wide, and 8 mm deep, and melted at not less that 1400° C. for 20 minutes in order to re-melt it evenly. Then, the boat was turned around and melting was performed for another 20 minutes, after which the boat was held for 120 hours in a gradient furnace at 600 to 1000° C. The devitrified component that appeared in the glass was then observed, and the sample's ability to withstand devitrification was assessed by ascertaining the extent of devitrification. If significant devitrification occurred before the 120 hours were over, then the sample was removed from the gradient furnace at that point and the extent of the devitrification was assessed.

Using the clad glass compositions with good results in the above devitrification test, a direct drawing test for producing a double structure glass rod was performed. The procedure of this test is described below.

Figure 2:
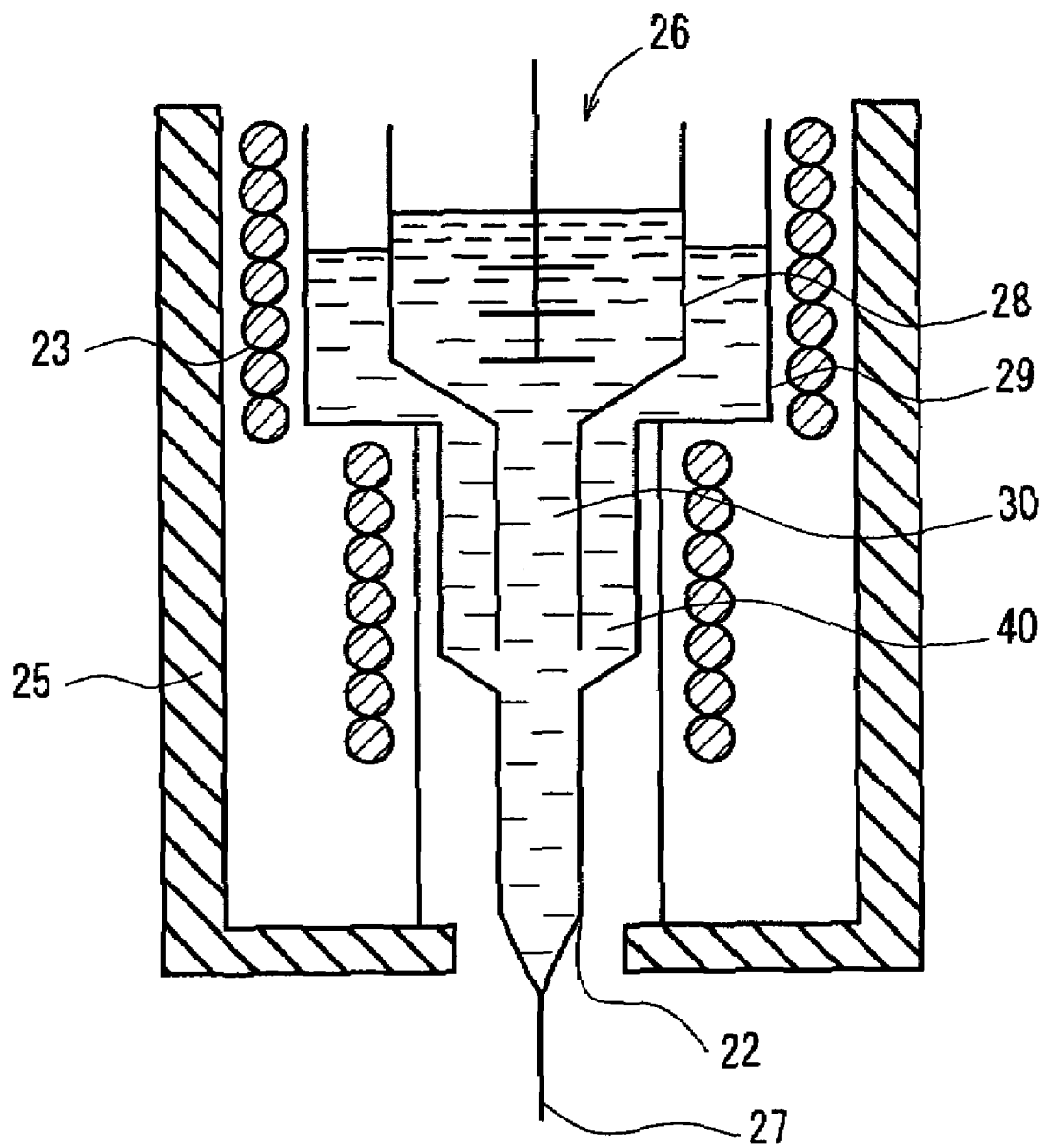
FIG. 2 is a schematic cross-sectional diagram of a conjugate direct drawing device used both conventionally and in the working examples of the present invention.

As shown in FIG. 2, a double crucible 26 is made of an inner crucible 28 and an outer crucible 29. Lens preform glass cullets are fed into the inner crucible 28 and clad glass cullets are fed into the outer crucible 29, and these are heated and melted inside the double crucible 26. A lens preform glass 30 from the inner crucible 28 and a clad glass 40 from the outer crucible 29 are then extruded simultaneously from the lower nozzle 22 and drawn by a drawing roller (not shown) to obtain a double glass rod 27 in which the lens preform glass 30 and the clad glass 40 are fused into a single unit. At this time, the height difference in the liquid surfaces of the molten glass body or the location and the temperature of the nozzle were adjusted so as to obtain a rod in which the diameter of the lens preform glass portion was approximately 1.1 mm and the thickness of the clad glass portion was 15 μm.

While this glass rod was subjected to conjugate drawing, the glass surface and its interior were checked for devitrification. The number of days that devitrification does not occur is defined as "No. of days continuous drawing possible".

The compositions of the clad glasses of Working Examples 1 to 4 are shown in Table 1. Table 1 also shows a composition including PbO, which serves as Comparative Example 1, and a composition including TiO$_2$, which serves as Comparative Example 2. Table 2 shows the compositions (Working Examples A to C) of the graded-index lens preform glasses used to test the clad glasses according to Working Examples 1 to 4. Table 2 also shows a composition that includes PbO, which serves as a comparative example. The test results for the clad glasses according to Working Examples 1 to 4 and Comparative Example 2 exhibited no substantial difference with respect to the preform glass composition according to Working Examples A to C. The clad glass including PbO according to Comparative Example 1 was tested using the preform glass including PbO (comparative example).

The clad glasses of the compositions according to Working Examples 1 and 2, which include neither PbO nor TiO$_2$, did not exhibit devitrification in the gradient furnace test. In a direct drawing test using the clad glasses of these compositions, drawing could be maintained without the occurrence of devitrification for at least eight days, and compared to a case in which TiO$_2$ is included (see Comparative Example 2), there was a marked improvement in the continuous drawing properties.

The clad glasses of the compositions of Working Examples 3 and 4, which include neither PbO, TiO$_2$, nor La$_2$O$_3$, also did not exhibit devitrification in the gradient furnace test. In a direct drawing test using the clad glasses of these compositions, drawing could be maintained without the occurrence of devitrification for at least 20 days, and compared to a case in which La$_2$O$_3$ is included, the continuous drawing properties could be improved even further.

It should be noted that as the composition of the lens preform glass, compositions in which the following conditions (unit: mol %)

$SiO_2$: 45 to 65
$Li_2O$: 3 to 20
$Na_2O$: 3 to 15
$K_2O$: 0 to 10
$MgO$: 0 to 15
$BaO$: 0 to 20
$TiO_2$: 0 to 10
$ZnO$: 0 to 10
$La_2O_3$: 0 to 7
$B_2O_3$: 0 to 15 and $Li_2O+Na_2O+K_2O$: 6 to 35 are satisfied are within the composition ranges where the clad glass compositions of the working examples are effective for preventing devitrification.

As shown in Table 2, the preform glasses of the above composition range were ideal for producing a graded-index rod lens with an angle of aperture of about 12°. When these preform glasses were used, the Abbe number increased to 40 or more, in comparison to the Abbe number of less than 40 of the glass including PbO (see comparative example), thus improving the color dispersion properties.

Comparative Examples

In the gradient furnace test, devitrification occurred within 72 hours with the clad glass composition of Comparative Example 2, which does not include PbO but includes $TiO_2$, due to the nucleation of the Ba—Ti—Si system or the La—Ti—Si system.

Also, although the combination of the preform glass and the clad glass including PbO was excellent from the standpoint that devitrification did not occur easily, as was mentioned previously, there was a problem with lens performance, namely that the color dispersion was large.

TABLE 1

| | | Wrkn. Ex. 1 | Wrkn. Ex. 2 | Wrkn. Ex. 3 | Wrkn. Ex. 4 | Comp. Ex. 1 | Comp. Ex. 2 |
|---|---|---|---|---|---|---|---|
| Composition (mol %) | $SiO_2$ | 65 | 60 | 60 | 60 | 55 | 60 |
| | $Na_2O$ | 15 | 20 | 15 | 19 | 20 | 15 |
| | MgO | 4 | 3 | 6 | 1 | 15 | 12 |
| | BaO | 6 | 3 | 6 | 5 | 2 | 8 |
| | $TiO_2$ | — | — | — | — | 3 | 3 |
| | ZnO | 5 | 2 | 7 | 10 | — | 1 |
| | $La_2O_3$ | 5 | 6 | — | — | — | 1 |
| | $B_2O_3$ | — | 6 | 6 | 5 | — | — |
| | PbO | — | — | — | — | 5 | — |
| | Total | 100 | 100 | 100 | 100 | 100 | 100 |
| Occurrence of Devitrification (test time) | | No (120 h) | No (120 h) | No (450 h) | No (450 h) | No (120 h) | Yes (72 h) |
| No. of Days Continuous Drawing Possible | | — | 8 | — | 20 | 28 | — |

TABLE 2

| | | Wrkn. Ex. A | Wrkn. Ex. B | Wrkn. Ex. C | Comp. Ex. |
|---|---|---|---|---|---|
| Composition (mol %) | $SiO_2$ | 60 | 62 | 60 | 56 |
| | $Li_2O$ | 12 | 10 | 14 | 10 |
| | $Na_2O$ | 5 | 6 | 7 | 9 |
| | MgO | 5 | 6 | 5 | 14 |
| | BaO | 5 | 6 | 4 | 2 |
| | $TiO_2$ | 3 | 4 | 5 | 3 |
| | ZnO | 4 | 1 | 2 | — |
| | $La_2O_3$ | 6 | 4 | 2 | — |
| | $B_2O_3$ | — | 1 | 1 | — |
| | PbO | — | — | — | 6 |
| | Total | 100 | 100 | 100 | 100 |
| Optical Properties | Abbe No. | 49 | 45 | 48 | 38 |
| | Aperture Angle (°) | 12 | 11 | 13 | 11 |

When the above working examples are considered together, the range of the clad glass composition with which devitrification does not occur even during direct drawing and with which there is high productivity can be defined as below.

$SiO_2$ is the principle component making up the network structure of the glass. When $SiO_2$ is less than 45 mol %, glass is not formed easily and lens molding is difficult, whereas when it is above 65 mol % the melting temperature becomes elevated and the glass not suited for practical use.

$NaO_2$ is an essential component for lowering the melting temperature. When $NaO_2$ is less than 3 mol % the melting temperature noticeably increases, whereas when it is above 30 mol % there is a drop in the chemical durability.

$K_2O$ is not an essential component, but it is used to lower the melting temperature. However, when $K_2O$ is greater than 10 mol % there is a drop in chemical durability.

MgO is not an essential component, but it is used to adjust the melting temperature. However, when the MgO concentration is greater than 15 mol %, devitrification is more apt to occur.

BaO is not an essential component, but is it used to adjust the melting temperature. However, when the BaO concentration is greater than 20 mol %, the relative density becomes too large.

Here, by setting the total quantity of $Na_2O$ and $K_2O$ to not more than 35 mol %, the lens preform glass is formed easily without compromising its practical weather resistance.

Furthermore, by setting the total quantity of MgO and BaO to not more than 25 mol %, devitrification is unlikely to occur and melting becomes easy.

It should be noted that in addition to the above essential components, it is also possible to suitably add $B_2O_3$, ZnO, $TiO_2$, $Y_2O_3$, $ZrO_2$, $Nb_2O_5$, $In_2O_3$, $La_2O_3$, and/or $Ta_2O_5$ as auxiliary material. A content of at least one of $TiO_2$ and $La_2O_3$ is substantially 0 mol %. Here, $B_2O_3$ is used for enhancing the glass forming ability. And ZnO, $TiO_2$, $Y_2O_3$, $ZrO_2$, $Nb_2O_5$, $In_2O_3$, $La_2O_3$, and/or $Ta_2O_5$ are used for rising index of refraction. The preferable composition ranges of these auxiliary materials are as follows (unit: mol %):

$B_2O_3$: 0 to 15
ZnO: 0 to 10
$TiO_2$: 0 to 10
$Y_2O_3$: 0 to 7
$ZrO_2$: 0 to 7
$Nb_2O_5$: 0 to 7
$In_2O_3$: 0 to 7
$La_2O_3$: 0 to 7
$Ta_2O_5$: 0 to 10

However, devitrification occurs easily when the total quantity is greater than 20 mol %. The composition range of $TiO_2$ is preferably 0 to 7 mol %. More preferably, $TiO_2$ is not included. Also, it is clear from a comparison of Working Examples 1 and 3, 2 and 4 that $La_2O_3$ is preferably not included.

It is clear from Tables 1 and 2 that the products of the working examples of the present invention are not prone to the problem of devitrification even when molding using a melt drawing device is continued for extended periods, and excellent optical performance with the Abbe number at 45 to 49 was confirmed in the aperture angle range of 11 to 13°.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass rod for a graded-index rod lens,
   wherein a graded-index lens preform glass A is covered by and provided in a single unit with a clad glass composition B;
   (1) wherein the glass composition of the graded-index lens preform glass A expressed in mol % includes
   $SiO_2$: 45 to 65, $Li_2O$: 3 to 20, $Na_2O$: 3 to 15, $K_2O$: 0 to 10, MgO: 0 to 15, BaO: 0 to 20, $TiO_2$: 0 to 10, ZnO: 0 to 10, $La_2O_3$: 0 to 7, $B_2O_3$: 0 to 15, wherein $Li_2O+Na_2O+K_2O$: 6 to 35;
   (2) wherein the clad glass composition B substantially does not include PbO and substantially does not include $TiO_2$, and expressed in mol % includes
   $SiO_2$: 45 to 65, $Na_2O$: 3 to 30, $K_2O$: 0 to 10, MgO: 0 to 15, BaO: 0 to 20, wherein $Na_2O+K_2O$: 3 to 35 and MgO+BaO: 0 to 25;
   and furthermore includes
   $B_2O_3$: 0 to 15, ZnO: 0 to 10, $Y_2O_3$: 0 to 7, $ZrO_2$: 0 to 7, $Nb_2O_5$: 0 to 7, $In_2O_3$: 0 to 7, $La_2O_3$: 0 to 7, and $Ta_2O_5$: 0 to 10, wherein $B_2O_3+ZnO+Y_2O_3+ZrO_2+Nb_2O_5+In_2O_3;+La_2O_3+Ta_2O_5$: 0 to 20.

2. A graded-index rod lens,
   wherein a graded-index lens preform glass A is covered by and provided in a single unit with a clad glass composition B:
   (1) wherein the glass composition of the graded-index lens preform glass A expressed in mol % includes
   $SiO_2$: 45 to 65, $Li_2O$: 3 to 20, $Na_2O$: 3 to 15, $K_2O$: 0 to 10, MgO: 0 to 15, BaO: 0 to 20, $TiO_2$: 0 to 10, ZnO: 0 to 10, $La_2O_3$: 0 to 7, $B_2O_3$: 0 to 15, wherein $Li_2O+Na_2O+K_2O$: 6 to 35;
   (2) wherein the clad glass composition B substantially does not include PbO and substantially does not include $TiO_2$, and expressed in mol % includes
   $SiO_2$: 45 to 65, $Na_2O$: 3 to 30, $K_2O$: 0 to 10, MgO: 0 to 15, BaO: 0 to 20, wherein $Na_2O+K_2O$: 3 to 35 and MgO+BaO: 0 to 25;
   and furthermore includes
   $B_2O_3$: 0 to 15, ZnO: 0 to 10, $Y_2O_3$: 0 to 7, $ZrO_2$: 0 to 7, $Nb_2O_5$: 0 to 7, $In_2O_3$: 0 to 7, $La_2O_3$; 0 to 7, and $Ta_2O_5$: 0 to 10, wherein $B_2O_3+ZnO+TiO_2+Y_2O_3+ZrO_2+Nb_2O_5+In_2O_3;+La_2O_3+Ta_2O_5$: 0 to 20.

3. The graded-index rod lens according to claim 2, wherein the clad glass composition substantially does not include $La_2O_3$.

* * * * *